United States Patent
Lewarchik et al.

(10) Patent No.: US 11,149,151 B2
(45) Date of Patent: Oct. 19, 2021

(54) ONE PART, STORAGE STABLE POLYMERIZABLE FORMULATION FORMING CORROSION RESISTANT COATINGS

(71) Applicant: CHEMICAL DYNAMICS LLC, Plymouth, MI (US)

(72) Inventors: Ronald J. Lewarchik, Brighton, MI (US); Atman Fozdar, Ypsilanti, MI (US)

(73) Assignee: CHEMICAL DYNAMICS LLC, Plymouth, MI (US)

( * ) Notice: Subject to any disclaimer, the term of this patent is extended or adjusted under 35 U.S.C. 154(b) by 0 days.

(21) Appl. No.: 16/199,319

(22) Filed: Nov. 26, 2018

(65) Prior Publication Data

US 2020/0165464 A1 May 28, 2020

(51) Int. Cl.
| | |
|---|---|
| *C09D 5/08* | (2006.01) |
| *C09D 5/00* | (2006.01) |
| *C09D 167/08* | (2006.01) |
| *C09D 7/20* | (2018.01) |
| *C09D 135/02* | (2006.01) |
| *C09D 4/06* | (2006.01) |

(52) U.S. Cl.
CPC ............. *C09D 5/08* (2013.01); *C09D 4/06* (2013.01); *C09D 5/002* (2013.01); *C09D 7/20* (2018.01); *C09D 135/02* (2013.01); *C09D 167/08* (2013.01)

(58) Field of Classification Search
CPC ........ C09D 5/08; C09D 5/002; C09D 167/08; C09D 7/20; C09D 135/02; C09D 4/06

USPC ........................................................ 524/700
See application file for complete search history.

(56) References Cited

U.S. PATENT DOCUMENTS

| | | | |
|---|---|---|---|
| 8,927,649 B2 | 1/2015 | Lewarchik | |
| 2015/0125614 A1* | 5/2015 | Lewarchik | C09D 4/00 427/385.5 |
| 2018/0327605 A1* | 11/2018 | Terwillegar | C09D 4/00 |

FOREIGN PATENT DOCUMENTS

WO 2017112680 A1 6/2017

\* cited by examiner

*Primary Examiner* — Hui H Chin
(74) *Attorney, Agent, or Firm* — Blue Filament Law PLLC

(57) ABSTRACT

A one part, storage stable polymerizable formulation includes a monomeric or oligomeric ethylenically unsaturated polymerizable compound that is at least one of methacrylate esters of polyethylene glycols, 1,6-hexane diol, or polypropylene glycol, 1,3- and 1,4-butylene glycol trimethylol propane trimethacrylate, or ethoxylated bisphenol A dimethacrylate. A second polymerizable compound includes dicyclopentadiene modified oligomers. An organic solvent is present and provides storage stability and upon evaporation of the solvent, a rate of polymerization of the compound accelerates independent of addition of a second part. An alkyd is present that includes an unsaturated fatty acid. An optional additive of at least one of a transition metal cure accelerator, a filler, a plasticizer, a colorant, and a cure inhibitor is present. The formulation is at least 30 total weight percent solids. A process of forming a polymerized coating on an article is also provided.

14 Claims, 16 Drawing Sheets
(16 of 16 Drawing Sheet(s) Filed in Color)

ASTM B117 7,000 hour salt spray photos

ASTM B117, 1,500 hours salt spray test

ONE PART, STORAGE STABLE POLYMERIZABLE FORMULATION FORMING CORROSION RESISTANT COATINGS

FIELD OF THE INVENTION

The present invention in general relates to a one part polymerizable formulation well suited for coatings and in particular to free radical initiated polymerizable formulations that are stabilized primarily through solvent dilution.

BACKGROUND OF THE INVENTION

Corrosion is responsible for losses over $2.5 trillion of global losses every year. Corrosion of steel is one of the major issues faced by the transport industry (e.g. automobiles, aircraft, ships, etc.) and infrastructure (e.g. pipelines, buildings, bridges, oil rigs, refinery etc.), directly affecting the structural integrity of these vital assets, resulting in issues related to safety and maintenance of steel structures. Accordingly, attempts have been made to advance technologies to protect surfaces in order to combat corrosion.

The protection of a surface with a polymeric coating requires extensive removal of surface debris, grease, and other liquids from the surface, else the applied coating will have poor adhesion that reduces the coating lifetime and exposes the substrate to environmental exposure. These difficulties are compounded when higher molecular weight polymer precursors are used that, owing to size and conformational limitations, are unable to permeate well into a porous or scaly substrate. A further complication of coating a surface with a polymerizable formulation entails mixing of a two-part formulation to initiate the polymerization reaction and coating formation. As a result, the formulation must be applied on a timetable consistent with cure rate and also take into account the ever-increasing viscosity of the formulation upon combination of the formulation parts. The use of a two part polymerizable formulation largely precludes spray application as curing tends to foul spray nozzles. Additionally, upon initiating polymerization of a two-part formulation, any unused formulation is wasted.

Even upon addressing of these handling issues, in terms of performance, providing coatings to protect metal substrates from salt corrosion remains an ongoing problem. It is appreciated that in many marine settings, such as oil rigs, wind turbines, pilings, and ships treating corrosion and maintenance work dwarfs the initial installation cost. In spite of the long standing problem, few suitable polymeric coating options exist to inhibit salt corrosion.

Owing to these limitations, there exists a need for a one part, storage stable polymerizable formulation. Such a formulation is amenable to spray, roll or brush application. There further exists a need for a formulation that cures to a coating with excellent anti-corrosion properties.

SUMMARY OF THE INVENTION

A one part, storage stable polymerizable formulation includes a monomeric or oligomeric ethylenically unsaturated polymerizable compound that is at least one of methacrylate esters of polyethylene glycols, 1,6-hexane diol, or polypropylene glycol, 1,3- and 1,4-butylene glycol trimethylol propane trimethacrylate, ethoxylated bisphenol A dimethacrylate, or a combination thereof. A second polymerizable compound is present and includes dicyclopentadiene modified oligomers. An organic solvent in which the polymerizable compound and the second polymerizable compound are soluble is present and provides storage stability and upon evaporation of the solvent, a rate of polymerization of the compound accelerates independent of addition of a second part. An alkyd is present that includes an unsaturated fatty acid. An optional additive of at least one of a transition metal cure accelerator, a filler, a plasticizer, a colorant, and a cure inhibitor is present. The formulation is at least 30 total weight percent solids.

A process of forming a polymerized coating on an article is also provided that includes the application of the formulation to a substrate of the article. After allowing sufficient time and temperature for the solvent to evaporate to accelerate a rate of cure of the polymerizable compound, a polymerized coating on the article is formed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE PREFERRED EMBODIMENTS

Figure 1:
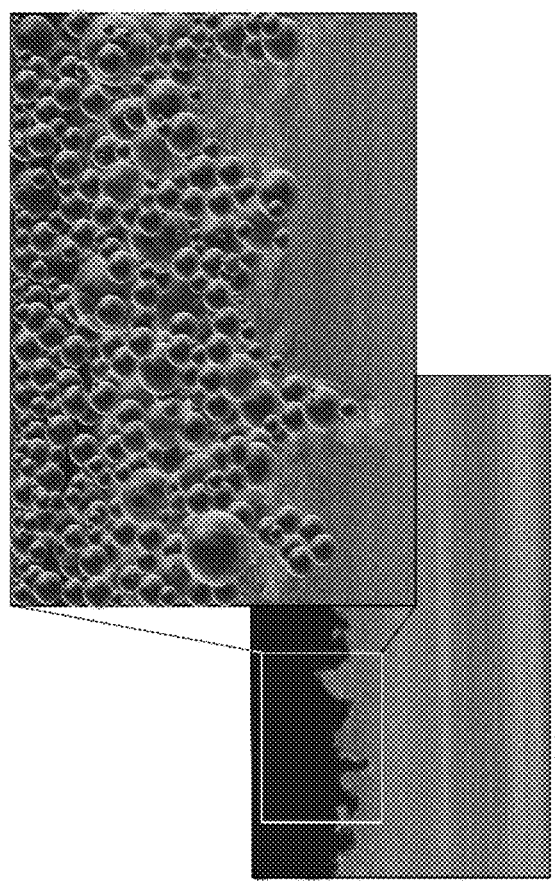
FIG. 1 is a color schematic diagram of high crosslink density of reactive double bonds of an inventive formulation penetrating a substrate.
Figure 2A:
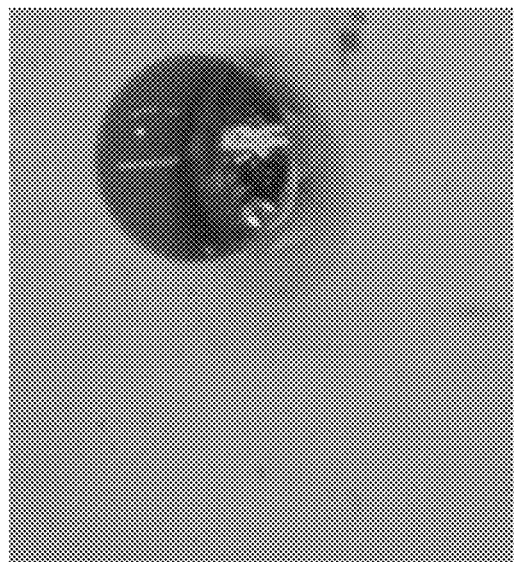
FIG. 2A is a color photograph of a water droplet on a surface coated with Superdrophobic or Hydrophobic Additive herein referred to as "HA", demonstrating superhydrophobicity.
Figure 2B:
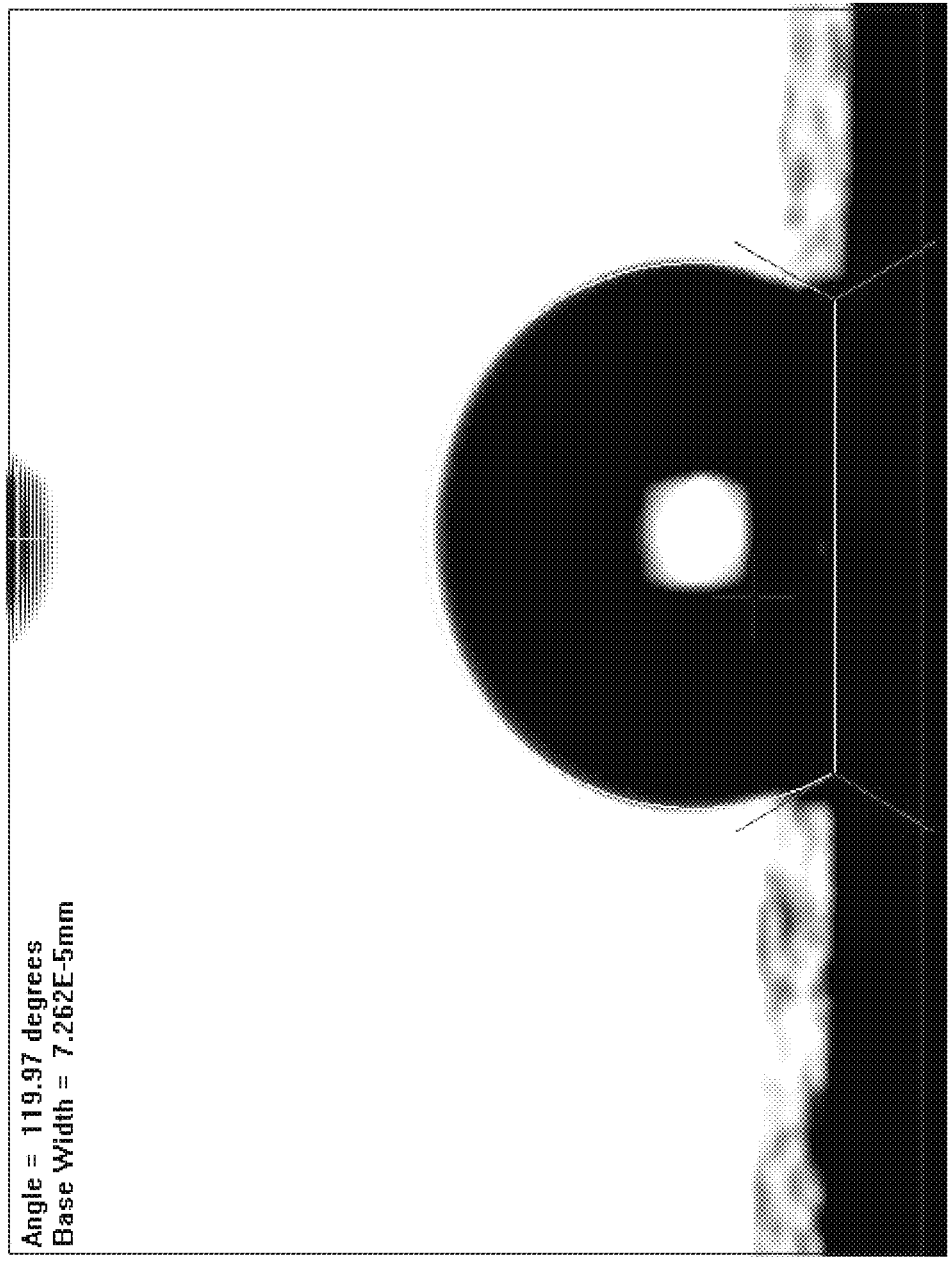
FIG. 2B shows a contact angle of the hydrophobic coating made using HA as a color photograph.
Figure 3:
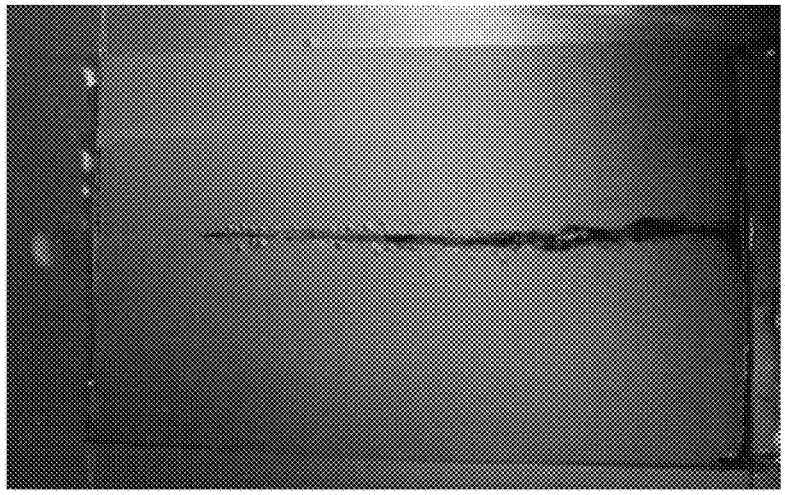
FIG. 3 is color photograph of zinc phosphated cold rolled steel (CRS) panel coated with Inventive coating after 1,000 hours of salt spray testing per ASTM B117.

The present invention has utility as a polymerizable formulation from which a coating is formed upon application to a substrate. According to the present invention, storage stability is obtained in a one part polymerizable formulation through the inclusion of a quantity of solvent and polymerization inhibitors sufficient to dilute an ethylenically unsaturated polymerizable compound and an initiator and/or catalyst to concentrations at which the polymerization is arrested. As a result, a formulation with consistent viscosity is applied and only upon dissipation of the organic solvent and exposure to air does polymerization of the inventive formulation kinetically accelerate. As a result, an inventive formulation is applied with a consistent viscosity and unused formulation is readily stored for further usage. Through selection of monomeric ethylenically unsaturated polymerizable compounds, an inventive formulation is able to penetrate the surface of a fouled substrate prior to polymerization thereby allowing for protective coating to be applied to a substrate with lessened or no substrate preparation prior to application of the inventive formulation. Representative fouled substrates to which an inventive formulation is directly applied illustratively include corroded metals such as rusted steel, oxidized aluminum, anodized aluminum, pickled steel, stainless steel, painted metals, and hot dipped galvanized steel, Galfan, Galvalume, Zincalume; cement; concrete; wood substrates such as painted wood, partially rotted wood, fabrics, drywall and plastics with porous surfaces as well as fiberboard. An inventive formulation is particularly well suited for formulation as an aerosol with a propellant. An attribute of a coating produced by an inventive formulation is that an air and moisture barrier is formed that inhibits subsequent corrosion of a substrate, even when already overlayered with a corrosion layer.

An inventive formulation includes low molecular weight oligomers whose unique aspect is a prevalence of three types of reactive double bonds on the resin backbone and low molecular weight reactive diluents. The three types of double bonds offer a synergistic curing mechanism that results in ancillary curing properties and high crosslink density that inhibits the penetration of soluble salts and moisture. Corrosion resistance is further improved when this resin blend is coupled with corrosion inhibitor pigments such as organically modified zinc aluminum molybdenum orthophosphate hydrate and zinc-5-nitroisophthalate.

An ethylenically unsaturated polymerizable compound operative in the present invention includes a carbon-carbon double bond referred to synonymously herein as point of ethylenic unsaturation. Operative moieties found within an inventive ethylenically unsaturated polymerizable compound include dicyclopentadiene modified oligomers of the formula (I), (II), (III) or (IV):

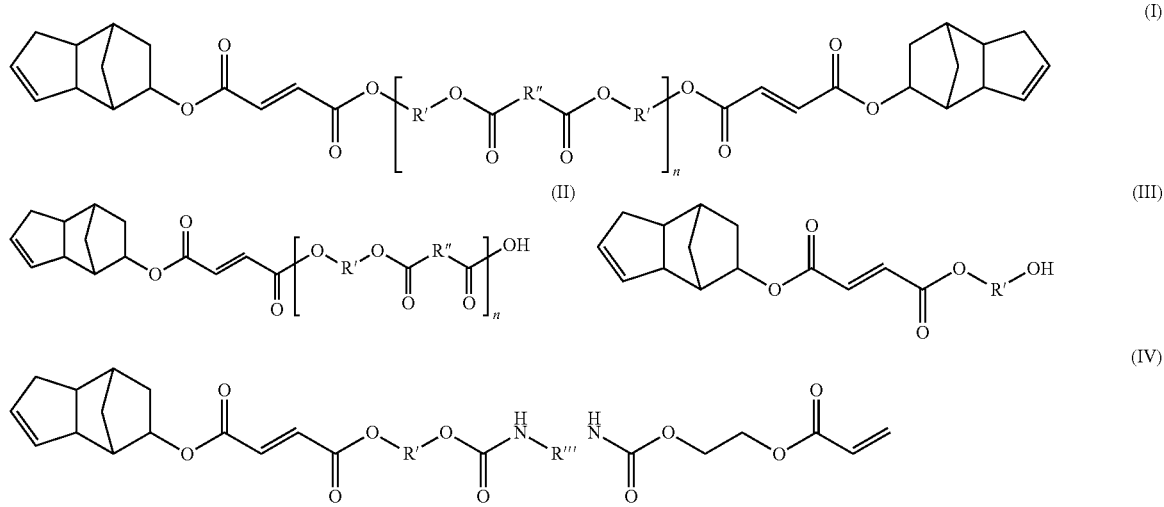

where R', R" and R''' are aliphatic, cycloaliphatic, araliphatic and hydrocarbon groups of 1 to 20 carbon atoms and n is 1 to 10. Dicyclopentadiene modified oligomers impart air drying characteristics, low profile properties, high heat distortion, excellent weathering performance, and increased filler dispersion in the resulting cured composition.

Acrylate moieties are also operative in an ethylenically unsaturated polymerizable compound of an inventive formulation and have the general formula:

where R in each occurrence is independently H, $C_1$-$C_4$ alkyl, $C_1$-$C_4$ perfluoroalkyl, $C_6$ aryl, $C_6$ aryl having at least one substituent of $C_1$-$C_4$ alkyl; n is an integer of 1 to 50; and Y is a nullity or a polymeric resin backbone of acrylic, oligomeric ester of up to 30 repeat units, polyester, epoxy, polyether, alkyd, polyurethane. Methacrylate moieties of the formula YRO(O)C—$CH_3$C=$CH_2$ are particularly preferred in an inventive formulation and noted to have a reduced reactivity relative to a corresponding purely protonated dicyclopentadiene modified oligomers and acrylate compound. As a general trend of reactivity dicyclopentadiene modified oligomers>acrylate>alkyl acrylate>aryl acrylate. Reactivity rates of a given ethylenically unsaturated polymerizable compound are a factor in controlling storage stability of a formulation.

It is appreciated that inclusion of a mixture of compounds per structures (I), (II), (III), and (IV) are readily prepared as an inventive formulation to optimize initial viscosity, storage stability, cure time, resultant coating hardness, and substrate adhesion characteristics. By way of example, an epoxy of any of formulas (I), (II), (III), and (IV) is noted to be well suited to improve adhesion to clean metal substrates such as aluminum and steel.

Representative ethylenically unsaturated polymerizable compounds operative herein illustratively include methyl methacrylate, hydroxyethyl methacrylate, tetrahydrofurfuryl methacrylate, trimethyl cyclohexyl methacrylate, cyclohexyl methacrylate, methacrylic acid, isobornyl methacrylate, ethoxyethyl methacrylate, 2-ethylhexyl methacrylate, and dicyclopentenyl oxyethyl methacrylate. Typical polyfunctional monomers include, but are not limited to, methacrylate esters of polyethylene glycols, such as the esters of triethylene glycol, 1,6-hexane dial, polypropylene glycol, 1,3- and 1,4-butylene glycol and 1,12-dodecanediol, trimethylol propane trimethacrylate, ethoxylated bisphenol A dimethacrylate.

Representative ethylenically unsaturated materials may also include a suitable unsaturated alkyd or suitable unsaturated alkyd-acrylic copolymer of acrylic oligomer or polymer modified to contain ethylenically reactive groups. Alkyds are prepared from polyols, dibasic acids and fatty acid. They are essentially oil modified polyesters. Alkyds are classified into oxidizing or nonoxidizing types. Oxidizing alkyds cross-link through air oxidizing polymerization. Alkyds can be further segmented into the amount of saturated or unsaturated oil that is used. For example, alkyds with an oil length of greater than 60% are long oil alkyds, oil lengths between 40 and 60% are known as medium oil alkyds and alkyds with less than 40% are known as short oil alkyds. Examples of unsaturated fatty acids for use to form alkyds that may be combined with suitable polyols and dibasic acids include soya, safflower and sunflower. Alkyds that contain suitable unsaturated fatty acid drying oils or other suitable ethylenically unsaturated materials can be used in conjunction with other ethylenically unsaturated compounds in subject invention.

Polymerization initiator is provided in an inventive formulation to commence a free radical polymerization reaction so as to form covalent bonds between the ethylenically unsaturated polymerizable compounds. Free radical initiators operative herein illustratively include ketone peroxide, diacyl peroxide, perester, perketals, diacyl peroxides, peroxydicarbonates, and hydroperoxide. Selection of a given initiator from among those listed above is dependent on factors such as the desired activation temperature of the inventive formulation, solubility of the initiator inventive formulation through appreciation that soluble initiators undergo homogeneous reaction catalysis that tends to be faster than that of insoluble initiators; and initiator degradation products. With respect to these factors, it is appreciated that initiator stability is dependent on energy activation associated with steric hindrance and resonant structure stability. With respect to products of degradation, initiators typically degrade to reduced product less an abstracted oxygen atom. Stability of the substrate towards this degradation product represents a consideration in creation of an inventive formulation. By way of example, dibenzoyl peroxide generates a primary degradation product of benzoic acid. Additionally, creating an inventive formulation, the inclusion of water within an organic solvent diluent is also a consideration as water typically reduces the effective cure rate and is often less volatile than an organic solvent. By way of an example, a free radical polymerization initiator having solubility in both water and organic solvent tends to be more stable and therefore less reactive in the presence of water. Representative initiators operative herein illustratively include those organic hydroperoxides having the formula ROOH wherein $R^6$ is a hydrocarbon radical containing up to about 18 carbon atoms, preferably an alkyl, aryl, or aralkyl radical containing from one to 12 carbon atoms. Typical examples of such hydroperoxides are cumene hydroperoxide, tertiary butyl hydroperoxide, methyl ethyl ketone peroxide, and hydroperoxides formed by the oxygenation of various hydrocarbons, such as methylbutene, cetane, and cyclohexene, and various ketones and ethers. Other examples of useful initiators include hydroperoxides such as p-menthane hydroperoxide, 2,5-dimethylhexane, and 2,5-dihydroperoxide. The initiator is typically present from 1 to 6 weight percent of the polymerizable compound, with from 2 to 4 weight percent of the polymerizable compound being preferred.

Suitable organic solvents operative herein illustratively include suitable solvents classified as exempt VOC solvents by the US EPA such as acetone, methyl acetate, ethyl acetate, butyl acetate, t-butyl acetate, dimethyl carbonate, 2-amino-2-methyl-1-propanol, parachlorobenzotrifluoride (PCBTF) as well as other solvents such as butanol, methyl ethyl ketone, methyl amyl ketone, VM&P Naptha, toluene, xylene, tetrahydrofuran, aromatic 100, 150 or 200, C2-C6 acetates such as n-propyl acetate, and n-hexyl acetate and 2-butoxy ethanol, other ethylene or propylene glycol based ether solvents. The organic solvent is selected so as to impart solubility on the polymerizable compound and preferably on the free radical initiator as well. Preferably, an acetate constitutes a majority component of the organic solvent present. The organic solvent is typically present from 1 to 40 weight percent of a fully formulated inventive formulation. An organic solvent or mixture of solvents is selected not only to solubilize the polymerizable compound but also to provide a balance of volatility to provide acceptable flow and leveling upon application and volatilize rapidly relative to the polymerization rate as residual solvent can diminish the barrier properties of a coating formed from an inventive formulation. Preferably, the organic solvent is present from 1 to 50 total weight percent. More preferably, the organic solvent is a ketone or an acetate present from 5 to 40 total weight percent. In the event that water is optionally added to the organic solvent, water is typically present from 1 to 10 total weight percent and preferably from 2 to 8 total weight percent.

Optionally, a cure accelerator is provided to modify the kinetics and progression of the polymerization process. Accelerators operative herein include salts of transition metals such as vanadium, molybdenum, cobalt, iron, zirconium, calcium, strontium, or copper. Of these transition metals, a combination of cobalt and manganese is known to the art to promote surface cure relative to through cure while zirconium or a combination of cobalt and zirconium and strontium facilitates through cure. Cobalt accelerators, zirconium and/or strontium accelerators, and a combination thereof are known to induce oxidation. Suitable accelerator salts operative herein include naphthenates, acetyl acetonates, and 2-ethyl hexanoic acid. Accelerators, if present, are found in an inventive formulation in an amount from 0 to 10 total weight percent and preferably between 0.01 and 1 total weight percent of the transition metal salt itself.

In instances when an accelerator is present, an anti-skinning agent such as an aliphatic keto oxime is provided to control surface oxidation associated with transition metal accelerator. Other anti-skinning agents are available as well as phenolics, nonylphenolics and oxime free anti-skinning agents from suppliers such as OMG trade named Ascinin (Skino #2) may also be used. Representative aliphatic keto oximes include methyl ethyl keto oxime, methyl propyl keto oxime, methyl tertbutyl keto oxime, and methyl isobutyl keto oxime. Typically, an aliphatic keto oxime is present from 0.2 to 3.0 total weight percent and is preferably present in concert with a cobalt-based accelerator. Cobalt-aliphatic keto oxime combinations are also known in the art to accelerate cure rates.

Other optional additives to an inventive formulation illustratively include fillers, plasticizers, colorants, and cure inhibitors.

Figure 4B:
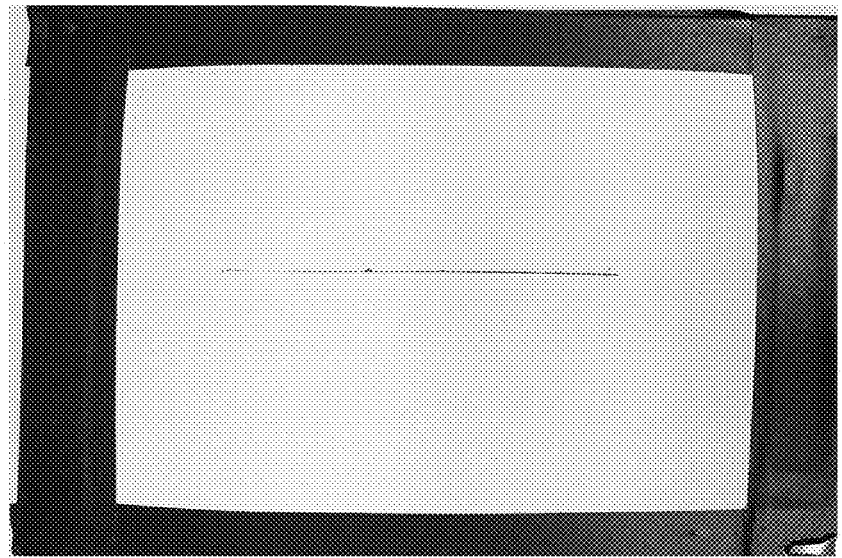
FIGS. 4A-4B are color photographs of Zinc-Nickel treated cold rolled steel samples after 7,000 hours of salt spray testing per ASTM B117 coated with an inventive coating formulation and 2K polyurethane top coat (FIG. 4A); an inventive coating formulation containing a HA for added protection and 2K polyurethane top coat also containing HA (FIG. 4B)

Fillers operative in an inventive formulation illustratively include particulate of silica, glass microspheres, calcium carbonate, talc, mica clay, diatomaceous earth, glass microspheres, polymeric microspheres, and combinations thereof. A filler is typically present from 0 to 20 total weight percent of a formulation. Fillers are appreciated to affect the hardness of a resultant coating formed from an inventive formulation and modify the rheology of the formulation. HA is appreciated to be a filler that can modify the bonding characteristics and the hydrophobicity of the formulation. According to embodiments, the formulation may include (HA), which is shown in FIG. 4B. Such HA produce a volumetric hydrophobic coating. Accordingly, even if a surface coated with the formulation is abraded, the underlying layers of the formulation still repel water and soluble salts. FIG. 4 shows a scanning electron microscopy (SEM) of a volumetric superhydrophobic coating.

An optional plasticizer is provided to modify the hardness of a resultant coating formed from an inventive formulation. A plasticizer is typically present from 0 to 10 total weight percent and preferably from 1 to 5 total weight percent. Plasticizers operative herein include phthalates such as diethyl, dibutyl, dibenzyl, and mixed benzyl-alkyl, and combinations thereof.

An optional pigment and/or colorant is provided to provide opacity, color, enhance environmental properties such as moisture and corrosion resistance and help provide improved physical properties such hardness and abrasion resistance. of a resultant coating formed from an inventive formulation. A colorant is typically present from 0 to 50 total weight percent and preferably from 2 to 25 total weight percent. Pigments and colorants operative herein include organic, inorganic and mixed metal oxide pigments such as carbon black, titanium oxide, phthalol blue, quinacridone red, red iron oxide, copper chrome black, extender pigments such as talc, barytes, silica, calcium carbonate, clay and corrosion inhibitive pigments normally comprised of the combination of sacrificial metal such as zinc or comprised of metal ions (cations) derived from: zinc, strontium, chromium, lead, molybdenum, aluminum, calcium or barium and anions, such as those derived from phosphorous (orthophosphoric and polyphosphoric acids), chromic acid and boric acid as well as soluble or insoluble dyes and combinations thereof.

An optional cure inhibitor is provided to modify the hardness of a resultant coating formed from an inventive formulation. A cure inhibitor is typically present from 0 to 5 total weight percent and preferably from 0.1 to 3 total weight percent. Cure inhibitors operative herein include phenolics such as 4-methoxyphenol and 4-tert-butylpyrocatechol, tert-butylhydroquinone, 1,4-benzoquinone, 6-tert-butyl-2,4-xylenol, 2,6-di-tert-butyl-p-cresol, 2,6-di-tert-butylphenol, 1,1-diphenyl-2-picrylhydrazyl, hydroquinone, 4-methoxyphenol, phenothiazine, and combinations thereof.

An inventive formulation is able to penetrate a corrosion overlayer and bond to an underlying substrate. Preferably, the cross-linking density is such that an inventive coating forms an air and moisture barrier to inhibit subsequent corrosion. To achieve such a result, preferably an inventive formulation is greater than 30 total weight percent solids as measured by heat cured weight relative to the as-applied formulation. More preferably, the formulation is greater than 50 total weight percent solids upon cure and most preferably is between 60 and 92 total weight percent solids. It is appreciated that higher percent solids formulations tend to have higher initial viscosities and higher coating densities relative to lower percent solids.

It is appreciated that only a thin coating of between 10 and about 500 microns is needed to adequately protect a typical substrate. While an inventive formulation is readily applied to a substrate by swabbing or pump spray, it is appreciated that coating uniformity is readily obtained by application by air or airless spray, brush, roller, aerosol spray, direct or indirect roll coat. For aerosol spray or pump spray application, a propellant is optionally added in a range from 5 to 95 total weight percent with the proviso that the propellant and diluent solvent together do not exceed 97 total weight percent of the formulation. Suitable propellants include those that are unreactive towards the capped silanol fluid and illustratively include alkanes such as butane, pentane, isobutane, propane; ethers such as dimethyl ether, diethyl ether, nitrogen; halogenated hydrocarbons; carbon dioxide and combinations thereof. The resultant formulation inclusive of a propellant is sealed within a conventional metal aerosol canister and applied by spray application. Upon complete cure, typically greater than 72 hours, an inventive coating is amenable to reapplication of an inventive formulation or a conventional paint application. Suitable paints include oil-based, latex, and water-based paints. The present invention is further detailed with respect to the following nonlimiting examples.

Example 1

A component per formula (I) is prepared by adding 135 grams of dicyclopentadiene to 18.67 grams of water under nitrogen and heating this mixture to 80° C. 96.86 grams of maleic anhydride is added gradually to the mixture of dicyclopentadiene and water under nitrogen and is held at 125° C. for 2 hours. At the end of incubation at 125° C. for two hours, 79 grams of 1,3-propanediol, 73.3 grams of adipic acid and 6.63 grams of trimethylolpropane are added and gradually heated to 205° C. The acid value of the final oligomer preparation was 25.5.

Example 2

Thirty-five grams of trimethylol propane trimethacrylate are combined with 30 grams of 2 mol ethoxylated bisphenol A dimethacrylate and 20 grams of oligomer per Example 1 diluted with 10 grams of toluene. One gram of methacryloxypropyl trimethoxysilane is added along with 60 milligrams of cobalt 2-ethyl hexanoate and 60 milligrams of zirconium 2-ethyl hexanoate. Three grams of cumene hydroperoxide are added to the solvent diluted ethylenically unsaturated compound mixture. One gram of methyl ethyl keto oxime is mixed into the inventive formulation. The inventive formulation is storage stable for more than 1 month at ambient temperature fluctuating between 10° and 28° Celsius. The resultant formulation readily forms a coating upon cure.

Example 3

The formulation of Example 2 is repeated with a dicyclopentadiene-modified ester of formula (II) replacing that of formula (I) at equivalent weight levels. The resultant formulation cured upon toluene volatilization on a steel substrate to achieve a comparable coating.

Example 4

The formulation of Example 2 is repeated with a dicyclopentadiene-modified ester of formula (III) replacing that of formula (I) at equivalent weight levels. The resultant formulation cured upon toluene volatilization on a steel substrate to achieve a comparable coating.

Example 5

Commercially available corrosion inhibitive pigment in an amount of 6.84 total weight percent is added to the formulation of Example 2 and applied to cold rolled steel and is cured at 25° Celsius with complete cure after 96 hours. on the inventive primer variations with 1-5 total weight percent iron oxide alone (Inventive Primer Variation 1), 1-5 weight percent iron oxide and 10-50 parts per million MEHQ (Inventive Primer Variation 2), 1-5 weight percent iron oxide and 0.5-3 weight percent fumed silica (Inventive Primer Variation 3), 1-5 weight percent carbon black (Inventive Primer Variation 4). Ambient cure temperature cure at 25° Celsius is noted in between 16 and 24 hours with the resultant covered steel coupons being subjected to various tests. Full cure under ambient conditions prior to accelerated testing is 7-10 days. To accelerate cure, the compositions can be oven cured at a bake temperature of between 140-280 degrees Fahrenheit. Salt spray testing thereof is detailed hereafter with respect to FIGS. 5A-D.

Example 6

The inventive formulation of Example 2 is further tested as a coating with and without the addition of 16.5 total weight percent of superhydrophobic additive (referred to hereafter as HA). The resulting formulation is cured on the same steel coupons per Example 5 and thereafter overcoated with a 2K conventional polyurethane heavy-duty protective coating as an exemplary topcoat formulation. The topcoat is tested with or without the addition of 21 total weight percent of HA. Salt spray testing thereof is detailed hereafter with respect to FIGS. 6A-D.

Example 7

The coated steel coupons prepared in Examples 5 and 6 are subjected to various tests. The test coupons are prepared as above or detailed below and are subjected to the following tests on separate coupons to determine coating attributes:

Dry Film Thickness per ASTM D 7091 with the results listed in mils;
Adhesion per ASTM D3359 based on cross hatch testing and X-cut testing;
Impact per ASTM D2794 based on Direct Impact and Reverse Impact;
Pencil Hardness per ASTM D3363 based on Gouge Hardness testing and Scratch Hardness testing; and
MEK Rub per ASTM D5402.

The results of these tests for the various sample preparations are listed in Tables below.

TABLE 1

Test Results of samples prepared with various formulations of the Inventive Primer, overcoated with 2K Polyurethane topcoat. HA when present is added in an amount of 6-30 total weight percent of the solvated formulation.

| No Coating | ASTM D7091 DFT (mils) | ASTM D5402 MEK DR | ASTM D3359 Adhesion Test | | ASTM D3363 Pencil Hardness | |
|---|---|---|---|---|---|---|
| | | | Crosshatch | X-cut | Gouge Hardness | Scratch Hardness |
| 1 Inventive Primer + Topcoat | 5 + 5 | >500 | 4B | 4A | 2H | 3H |
| 2 Inventive Primer (w/HA) + 2K PU Topcoat (w/HA) | 5 + 5 | >500 | 4B | 5A | 3H | 3H |

Example 8

Figure 4A:
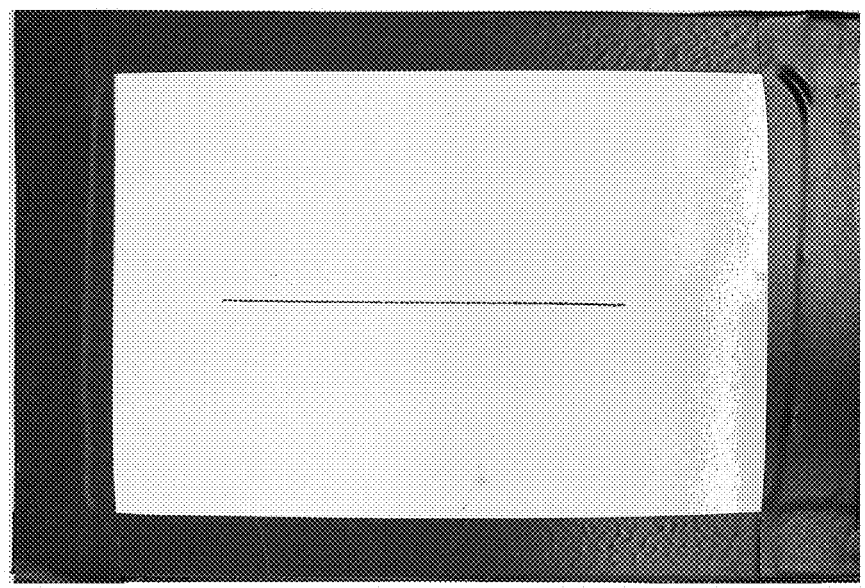
Figures 5A, 5B, 5C, 5D:
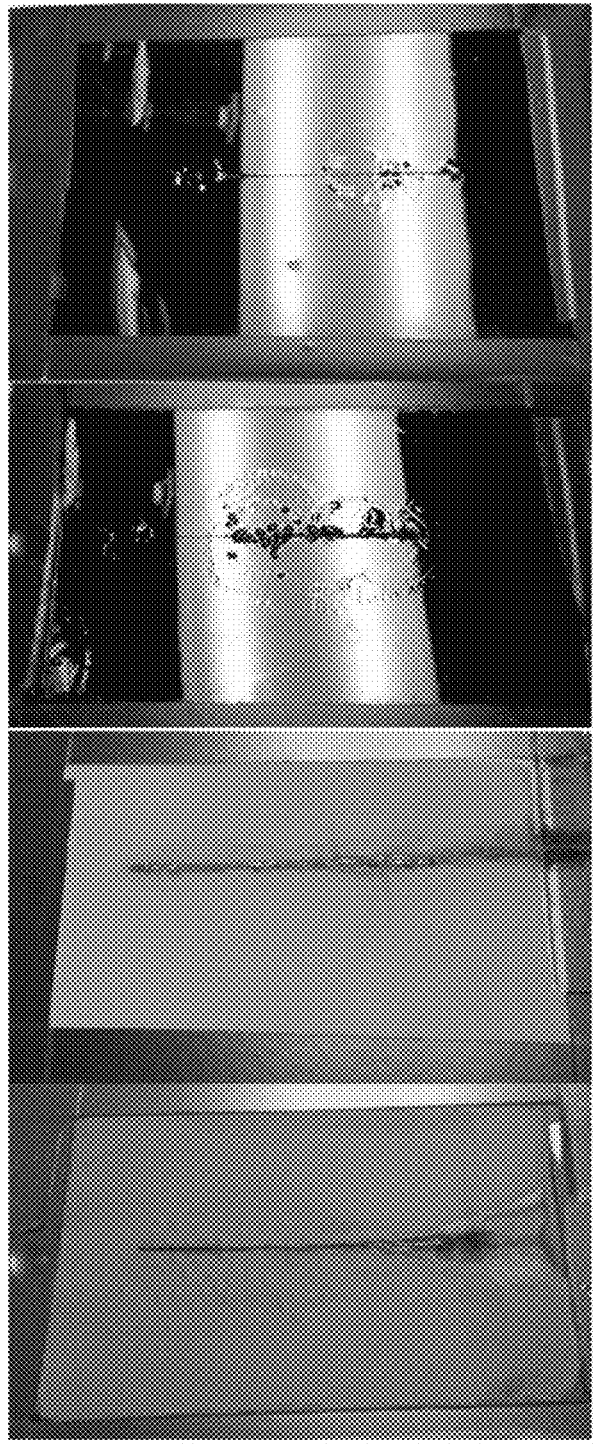
FIGS. 5A-5D are color photographs of prepared samples of the inventive coating (FIG. 5A), a conventional 2K Epoxy (FIG. 5B), conventional moisture cured Urethane 1 (FIG. 5C), and conventional moisture cured Urethane 2 (FIG. 5D) after 1,500 hours of salt spray testing according to ASTM B117.
Figure 6:
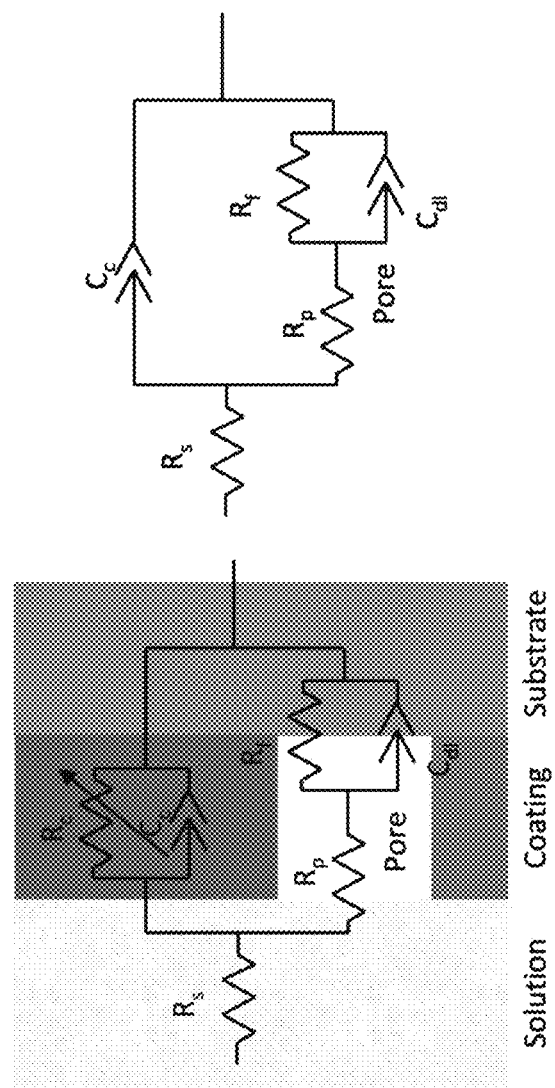
FIG. 6 is a representative circuit diagram showing the setup of the Electrochemical Impedance Spectroscopy (EIS) test system using a Gamry Reference 600 Potentiostat/Galvanostat/ZRA instrument.
Figure 7:
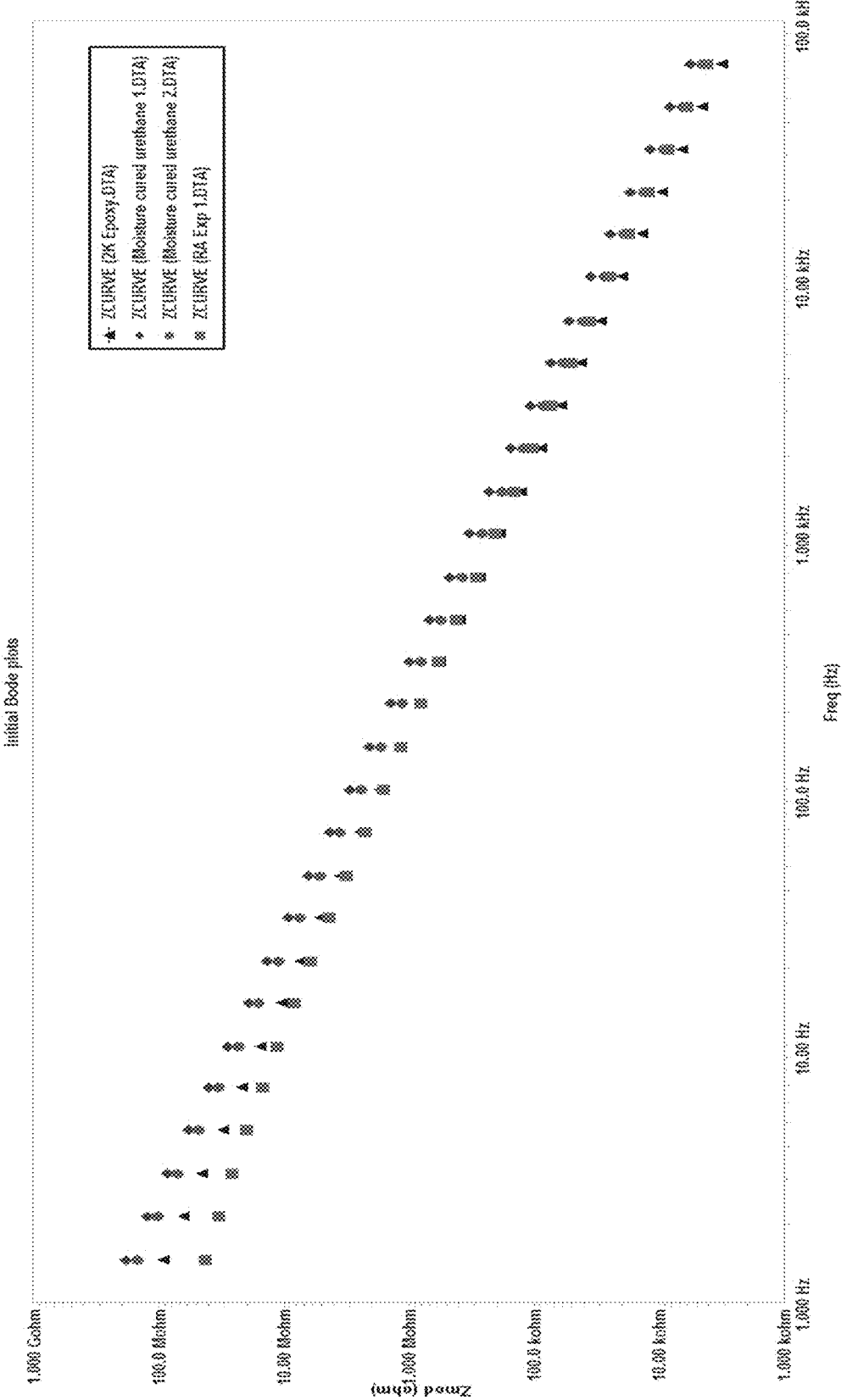
FIG. 7 is a graph showing initial bode plots of EIS testing on samples of the inventive coating, a conventional 2K Epoxy, moisture cured Urethane 1, and moisture cured Urethane 2.
Figure 8:
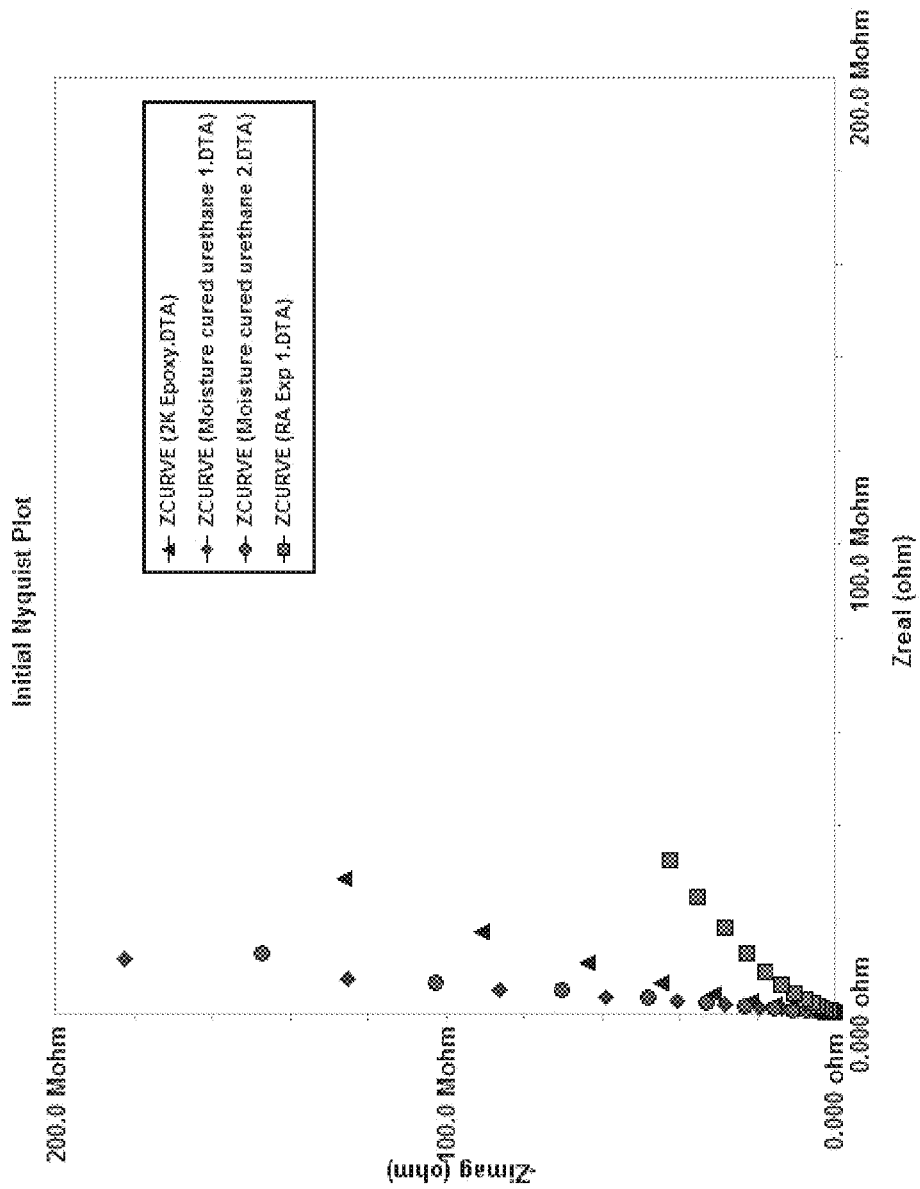
FIG. 8 is a graph showing initial Nyquist plots of EIS testing on samples of the inventive coating, a conventional 2K Epoxy, moisture cured Urethane 1, and moisture cured Urethane 2.
Figure 9:
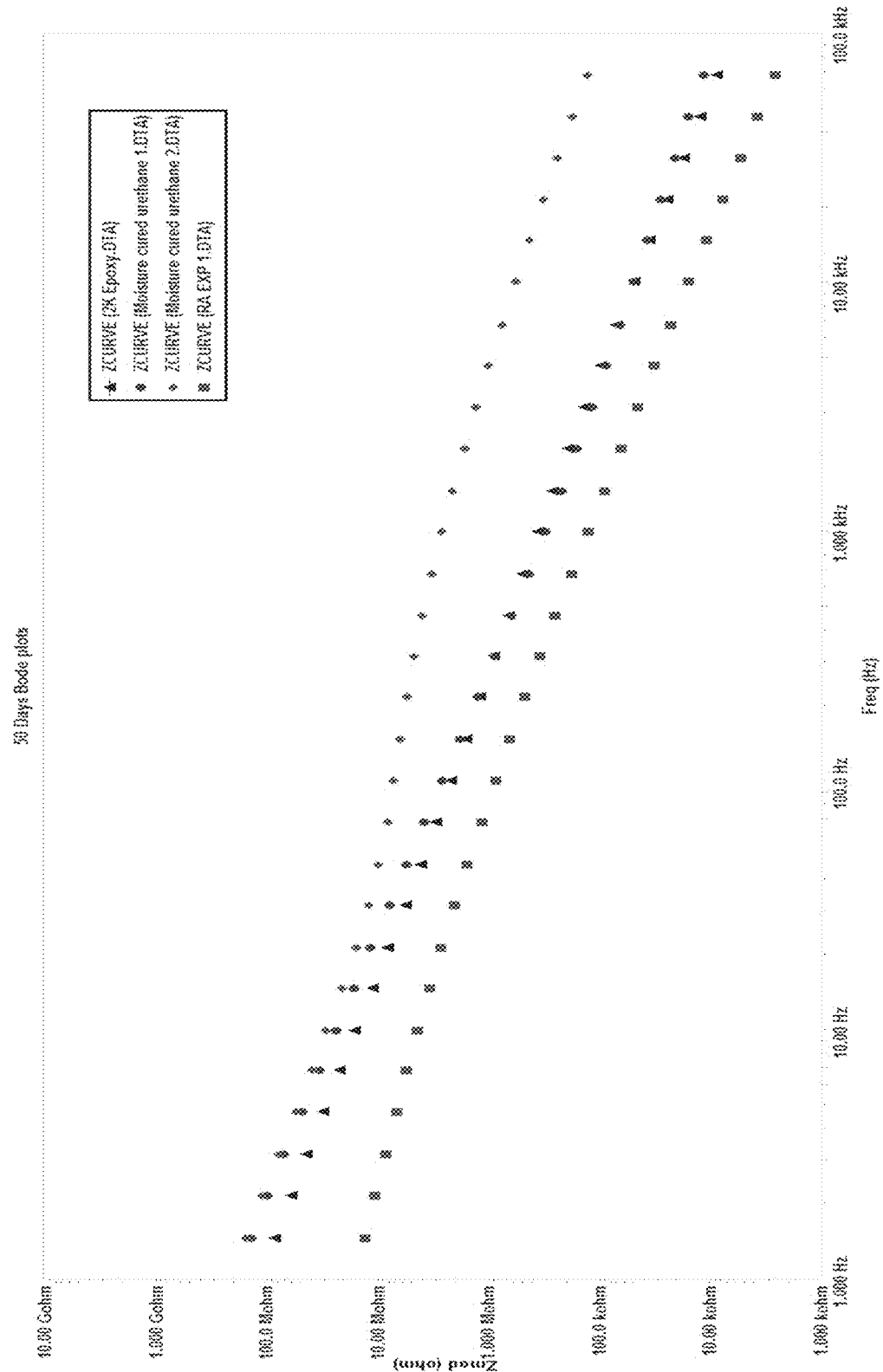
FIG. 9 is a graph showing 50 day bode plots of EIS testing on samples of the inventive coating, a conventional 2K Epoxy, moisture cured Urethane 1, and moisture cured Urethane 2.
Figure 10:
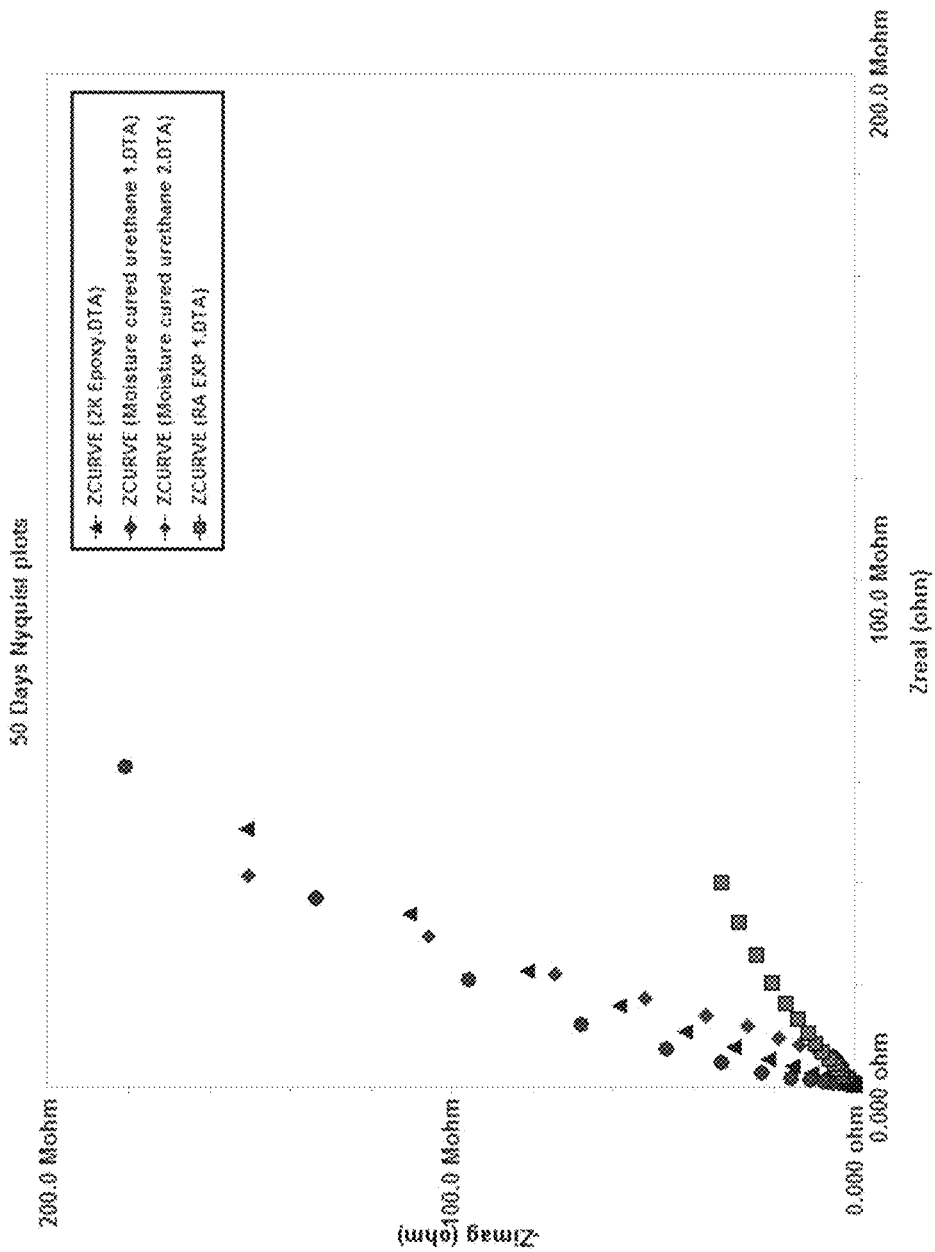
FIG. 10 is a graph showing 50-day Nyquist plots of EIS testing on samples of the inventive coating, commercial 2K Epoxy, moisture cured Urethane 1, and moisture cured Urethane 2.
Figure 11:
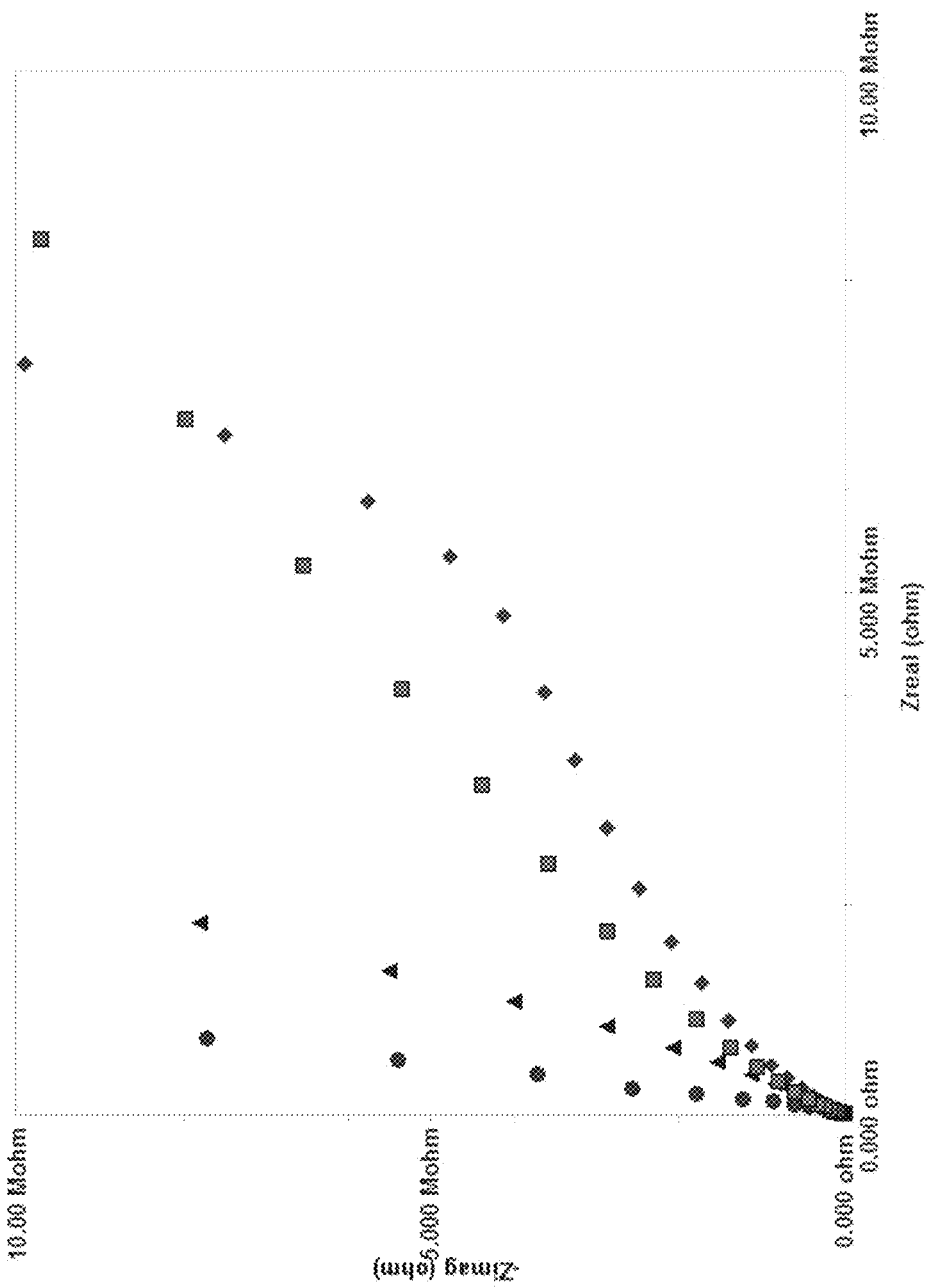
FIG. 11 is a graph showing magnified 50-day plots of EIS testing on samples of the inventive coating, a conventional 2K Epoxy, moisture cured Urethane 1, and moisture cured Urethane 2.

The inventive formulation of Example 5 is further tested as a coating with and without the addition of 16-18 total weight percent of HA. The resulting formulation is overcoated with a 2K conventional polyurethane heavy-duty protective coating as an exemplary topcoat formulation (referred to hereafter as 2K PU topcoat). The topcoat is tested with and without the addition of 16-18 total weight percent of HA. Results of salt spray testing thereof according to ASTM B117 for 7,000 hours are detailed with respect to FIGS. 4A-4B and reported in Table 2. FIG. 4A represents a panel coated with inventive coating and 2K PU topcoat and FIG. 4B represents a panel coated with inventive coating containing HA and overcoated with 2K PU topcoat containing HA.

TABLE 2

Scribed Zinc Nickel pretreated cold rolled steel panels

| Primer Identity | Field Blistering | | Field Corrosion | | Scribe Rating | | | |
|---|---|---|---|---|---|---|---|---|
| | | | | | Scribe Creep | | Scribe Blisters | |
| | No., severity | Rating | Description | Rating | (mm) | Rating | No, severity | Rating |
| Inventive coating (w/o HA) + 2K PU Topcoat (w/o HA) | 0, None | 10 | None | 10 | 0 | 10 | 0, None | 10 |
| Inventive coating (w HA) + 2K PU Topcoat (w HA) | 0, None | 10 | None | 10 | 0 | 10 | 0, None | 10 |

In Table 2, the results of the Field Blistering, Scribe Creep, and Scribe Ratings are in accordance with ASTM D1654, the Field Corrosion Ratings are in accordance with ASTM D610, and the Blister rating are in accordance with ASTM D714. The numbers listed in the "Rating" columns are ratings based on a 0 to 10 scale, with 0 being the worst score and 10 being the best score.

Example 9

Additional coupons are prepared and subjected to various tests for comparison. Steel coupons are prepared with the inventive formulation of Example 5, steel coupons coated with a 2K conventional epoxy are prepared, coupons are prepared of conventional moisture cure Urethane 1, and conventional moisture cured Urethane 2. The test coupons are subjected to the following tests on separate coupons to determine coating attributes.

Salt Spray Testing according to ASTM B117 for 1,500 hours with the results shown in FIGS. 5A-5D;

Electrochemical Impedance Spectroscopy (EIS) using a Gamry Reference 600 Potentiostat/Galvanostat/ZRA instrument with results shown in Table 10 below;

Crosshatch adhesion test per ASTM D3359;
Pencil Hardness (Gouge/Scratch) per ASTM D3363;
Methyl Ethyl Ketone double rubs per ASTM D5402;
Skydrol resistance per US military/Aerospace spec;
Gasoline resistance per ASTM D5402 and
Thermogravimetric Analysis (TGA).

Example 10

Some of the test coupons coated with inventive coating per Example 5 are subjected to Salt Spray Testing per ASTM B117 for 1,500 hours. It is then compared with Conventional 2K Epoxy, conventional Moisture cured Urethane 1 and Conventional Moisture cured Urethane 2. The results of the salt spray testing are presented in Table 3 below and shown in FIGS. 5A-D.

TABLE 3

ASTM B117 Salt Spray rating of samples.
Scribed Zinc Phosphate pretreated cold rolled steel panels

| Primer Identity | Field Blistering | | Field Corrosion | | Scribe Rating | | | |
|---|---|---|---|---|---|---|---|---|
| | | | | | Scribe Creep | | Scribe Blisters | |
| | No., severity | Rating | Description | Rating | (mm) | Rating | No, severity | Rating |
| Inventive coating | 0, None | 10 | GC | 8 | 2 | 7 | 6-8, F | 7 |
| Conventional 2K Epoxy | 0, None | 10 | GC | 6 | 5 | 5 | 0, None | 10 |
| Conventional Moisture cured Urethane 1 | 0, None | 10 | None | 9 | 0 | 10 | 2-4 M | 2.5 |
| Conventional Moisture cured Urethane 2 | 2-4 MF | 2.5 | GC | 9 | 7 | 4 | 2-4 MD | 1 |

In Table 3, the results of the Field Blistering, Scribe Creep, and Scribe Ratings are in accordance with ASTM D1654, the Field Corrosion Ratings are in accordance with ASTM D610, and the Blister rating are in accordance with ASTM D714. In Table 9, "GC" means "general corrosion," "FC" means "face corrosion,", "M" means "Medium", "MD"

means "Medium Dense", "F" means "Few" and "VF" means "very few" blisters. The numbers listed in the "Rating" columns are ratings based on a 0 to 10 scale, with 0 being the worst score and 10 being the best score.

Table 4 lists the results of the Electrochemical Impedance Spectroscopy (EIS) testing using a Gamry Reference 600 Potentiostat/Galvanostat/ZRA instrument for samples of the inventive coating, a conventional 2K Epoxy, moisture cured Urethane 1, and moisture cured Urethane 2. In the table "Cc" refers to Capacitance of an intact coating and "Rpo" refers to Pore Resistance of ion conducting paths developed in the coating. Graphs of FIGS. 7-11 further show the results of the EIS testing.

Figure 12A:
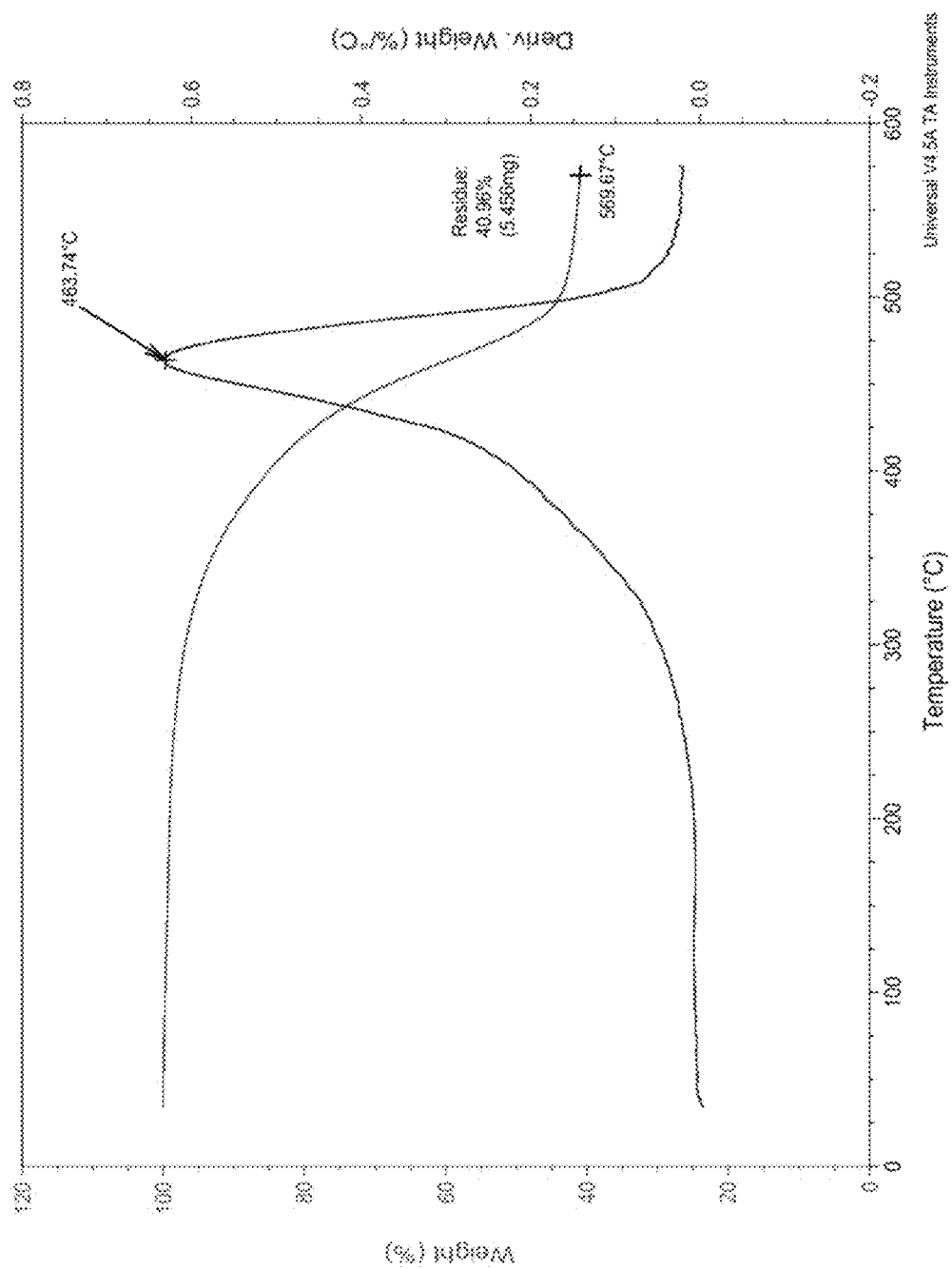
FIGS. 12A-12D are graphs showing Thermogravimetric Analysis (TGA) curve/decomposition temperature of samples of the inventive coating (FIG. 12A), a conventional 2K Epoxy (FIG. 12B), moisture cured Urethane 1 (FIG. 12C), and moisture cured Urethane 2 (FIG. 12D).
Figure 12B:
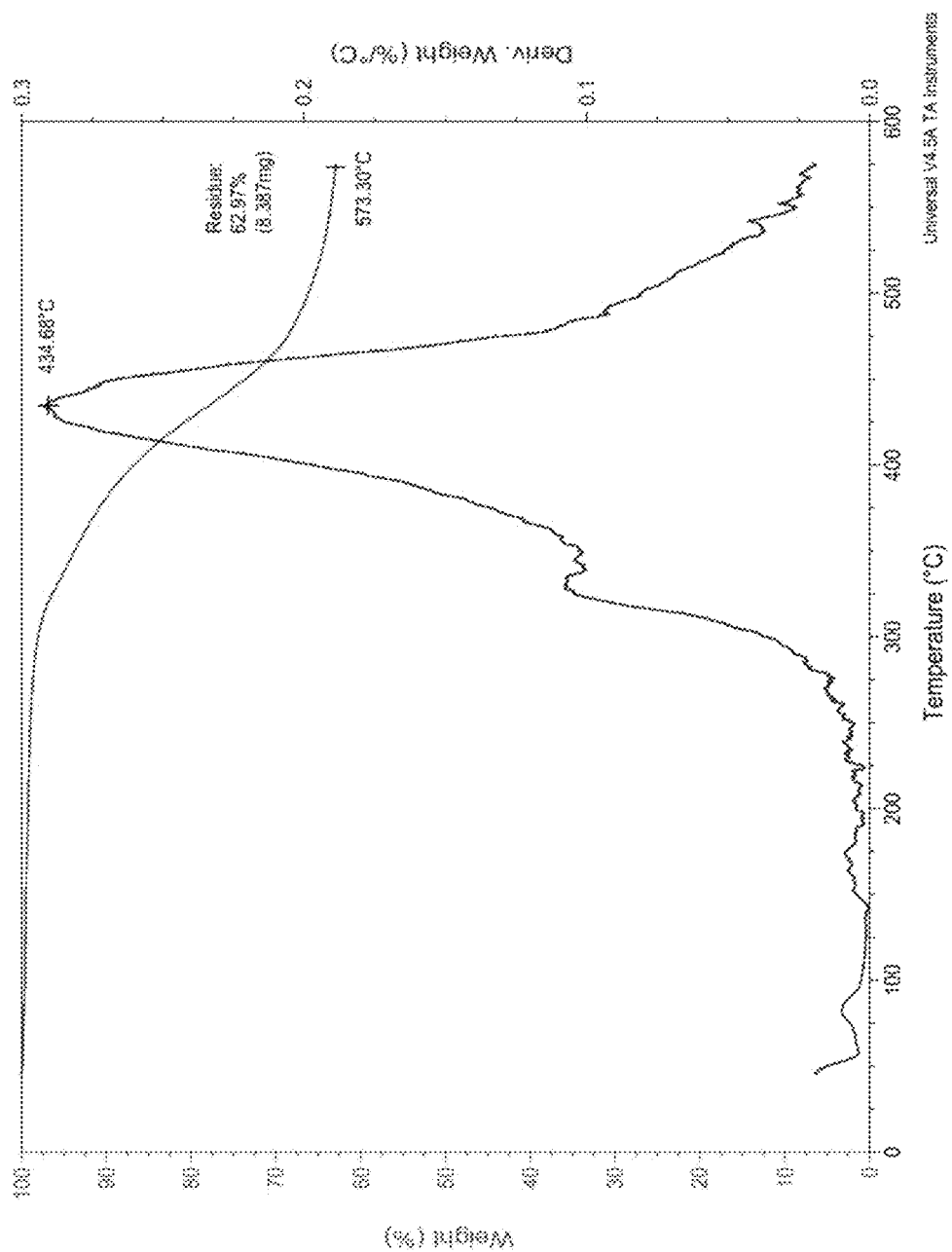
Figure 12C:
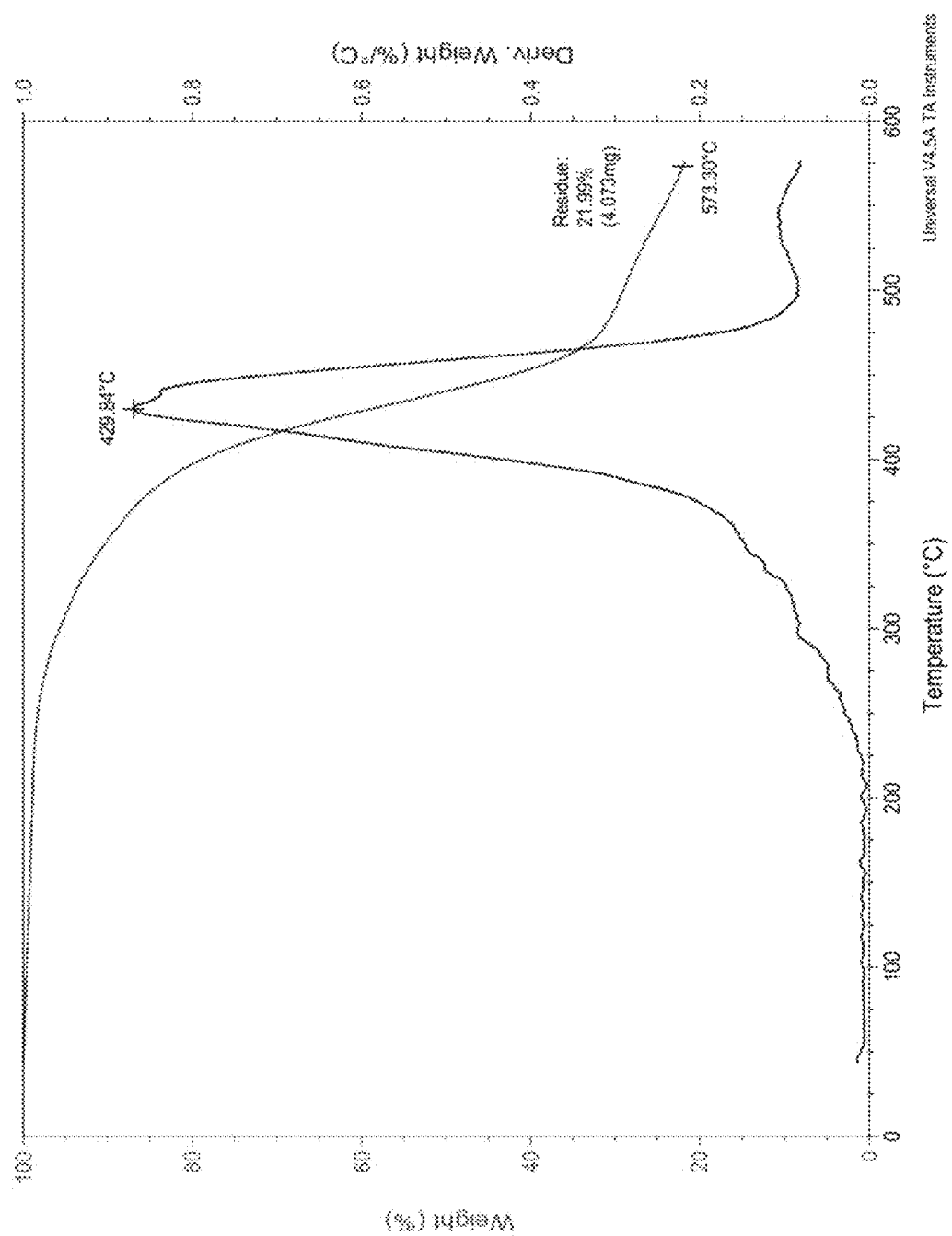
Figure 12D:
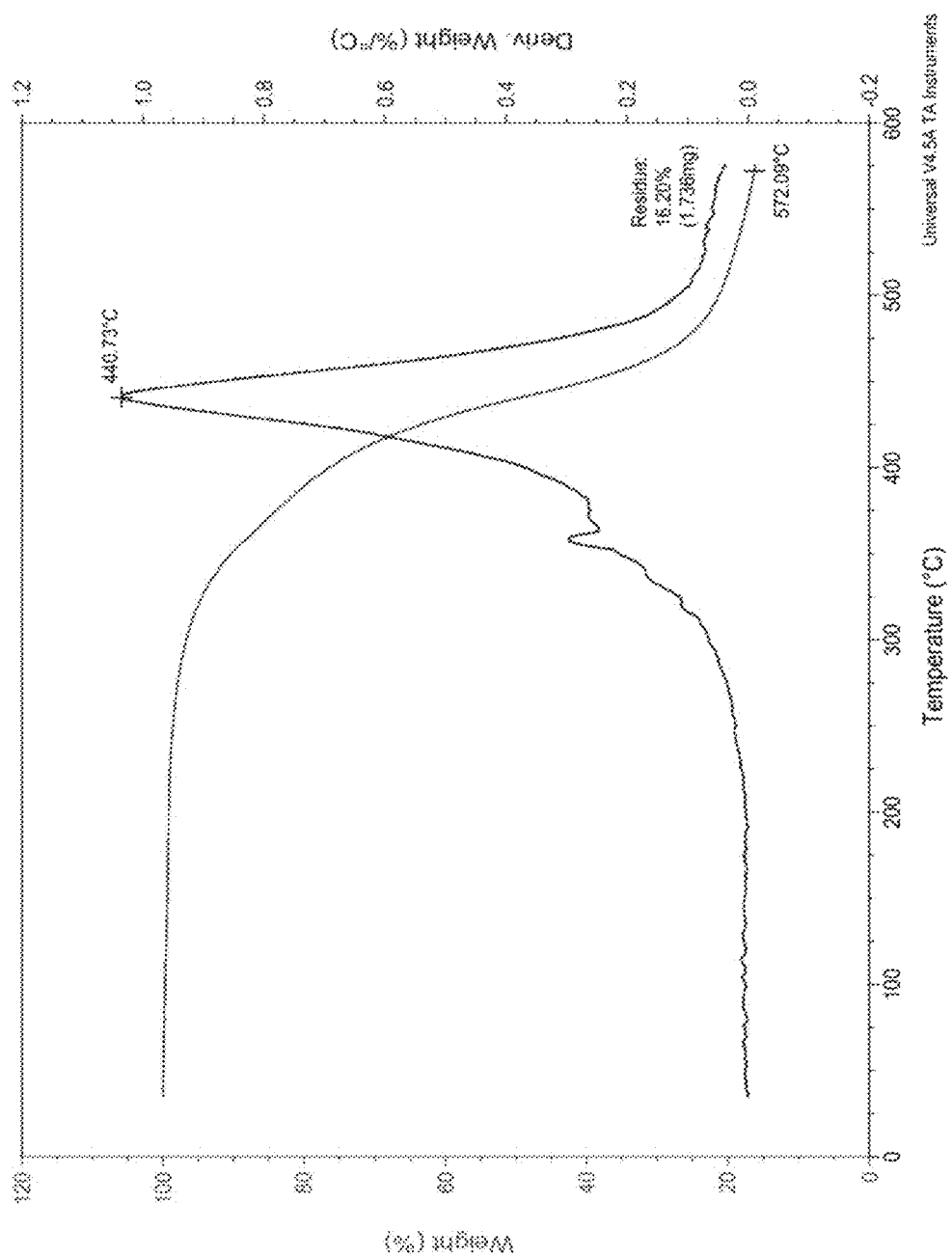

The results of the Thermogravimetric Analysis (TGA) are shown in FIGS. 12A-12D for samples of the inventive coating (FIG. 12A), a conventional 2K Epoxy (FIG. 12B), moisture cured Urethane 1 (FIG. 12C), and moisture cured Urethane 2 (FIG. 12D). These results show that the inventive formula coating has a comparatively higher decomposition temperature of 463.74° C., while conventional coatings based on conventional technology are in the range of 430-440° C. This shows that the inventive formulation coating can be used in an environment where coatings are exposed to extreme conditions such as high heat. (i.e. boilers, chemical processing equipment, pressurized vessels etc.)

Patent documents and publications mentioned in the specification are indicative of the levels of those skilled in the art to which the invention pertains. These documents and

TABLE 4

Pore resistance and capacitance of different systems after 50-day EIS test

| No. | System | Rpo, Initial ohms | Rpo, 50 days ohms | Cc, Initial farad | Cc, 50 days farad |
|---|---|---|---|---|---|
| 1 | Inventive Coating | 8.52E+07 | 6.53E+07 | 1.77585E−09 | 9.36663E−09 |
| 2 | 2K Epoxy | 7.11E+08 | 2.00E+09 | 1.22297E−09 | 2.31333E−09 |
| 3 | Conventional Moisture cured urethane 1 | 5.49E+10 | 9.39E+08 | 7.57613E−10 | 1.10414E−09 |
| 4 | Conventional Moisture cured urethane 2 | 4.29E+09 | 6.87E+08 | 8.26502E−10 | 2.83861E−10 |

Table 5 lists the results of Crosshatch adhesion testing, Pencil Hardness (Gouge/Scratch) testing, Methyl Ethyl Ketone double rub testing, Skydrol resistance testing, and Gasoline resistance testing performed on samples of the inventive coating, a conventional 2K Epoxy, moisture cured Urethane 1, and moisture cured Urethane 2. For these tests all physical and chemical tests are performed on ambient cured coated panels, 7 days after application. All the systems are applied at 5 mils or 125 microns on zinc phosphated cold rolled steel and sanded cold rolled steel panels.

publications are incorporated herein by reference to the same extent as if each individual document or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. A one part, storage stable polymerizable formulation consisting essentially of:

TABLE 5

| Test No | Description | Inventive coating | Conventional 2K Epoxy | Conventional Moisture cured urethane 1 | Conventional Moisture cured urethane 2 |
|---|---|---|---|---|---|
| 1 | Crosshatch adhesion ASTM D3359 | 4A | 5A | 5A | 5A |
| 2 | Pencil Hardness (Gouge/Scratch) ASTM D3363 | 3H/H | 2H/HB | 5H/2B | 5H/3B |
| 3 | Methyl Ethyl Ketone double rubs ASTM D5402 | >300 | 75 | 200 | 200 |
| 4 | Skydrol resistance per US military/ Aerospace spec | No swelling, change in gloss | Swelling, softening and gloss change | No swelling, change in gloss | Swelling, softening and gloss change |
| 5 | Gasoline resistance ASTM D5402 | No swelling, Minor change in gloss | No swelling, Minor change in gloss | No swelling, no gloss change | No swelling, Minor change in gloss | a monomeric or oligomeric ethylenically unsaturated polymerizable compound selected from methacrylate esters of polyethylene glycols, 1,6-hexane diol, or polypropylene glycol, 1,3- and 1,4-butylene glycol trimethylol propane trimethacrylate, ethoxylated bis-phenol A dimethacrylate, or a combination thereof;

a second polymerizable compound;

an organic solvent in which said polymerizable compound and said second polymerizable compound are soluble, said solvent providing storage stability and upon evaporation of said solvent, a rate of polymerization of said compound accelerates independent of addition of a second part;

an alkyd wherein the alkyd comprises an unsaturated fatty acid;

a cure inhibitor present from 0.1 to 3 total weight percent that is a phenolic;

an optional additive of at least one of a transition metal cure accelerator, a filler, a plasticizer, and a colorant;

wherein the formulation is at least 30 total weight percent solids; and wherein said monomeric or oligomeric ethylenically unsaturated polymerizable compound, said second polymerizable compound, and said alkyd cure synergistically to form a coating having a crosshatch adhesion test value of 4A according to ASTM D3359 and a methyl ethyl ketone double rub value greater than 300 according to ASTM D5402.

2. The formulation of claim 1 wherein said monomeric ethylenically unsaturated polymerizable compound is methacrylate esters of triethylene glycol.

3. The formulation of claim 1 wherein said organic solvent is at least one of methyl acetate, methyl ethyl ketone, toluene, methyl amyl ketone, tetrahydrofuran, C2-C6 alkyl acetate, 2-butoxy ethanol, aromatic100, or aromatic 150.

4. The formulation of claim 1 wherein the formulation is between 60 and 92 total weight percent solids.

5. The formulation of claim 1 wherein said second polymerizable compound is selected from a group consisting of molecules with the structural unit of formula (I), (II), (III) and (IV):

wherein R', R" and R'" are aliphatic, cycloaliphatic, aromatic and hydrocarbon groups of 1 to 20 carbon atoms and n is 1 to 10.

6. The formulation of claim 1 further comprising water.

7. The formulation of claim 1 further comprising a free radical polymerization initiator.

8. A process of forming a polymerized coating on an article comprising:

applying a formulation according to claim 1 to a substrate of the article; and allowing sufficient time and temperature for said solvent to evaporate to accelerate a rate of cure of said polymerizable compound to form a polymerized coating on the article.

9. The process of claim 8 wherein the formulation is applied as a pressurized aerosol atomized air spray, brush, roller or airless spray, dip or reverse roll coating.

10. The process of claim 8 wherein the substrate is overlayered with a corrosion layer and the applying step occurs absent prior corrosion layer removal and the formulation penetrates beneath the corrosion layer before cure and at least partially embeds the corrosion layer in the polymerized coating.

11. The process of claim 8 wherein the polymerized coating forms a moisture and air barrier.

12. The process of claim 8 further comprising adding a dye or pigment or filler to the formulation prior to the applying step.

13. The process of claim 8 wherein the polymerized coating forms a barrier to the penetration of moisture and water-soluble salts.

14. The formulation of claim 1 where said phenolic is 4-methoxyphenol, 4-tert-butylpyrocatechol, tert-butylhydroquinone, 1,4-benzoquinone, 6-tert-butyl-2,4-xylenol, 2,6-di-tert-p-cresol, 2,6-di-tert-butylphenol, 1,1-diphenyl-2-

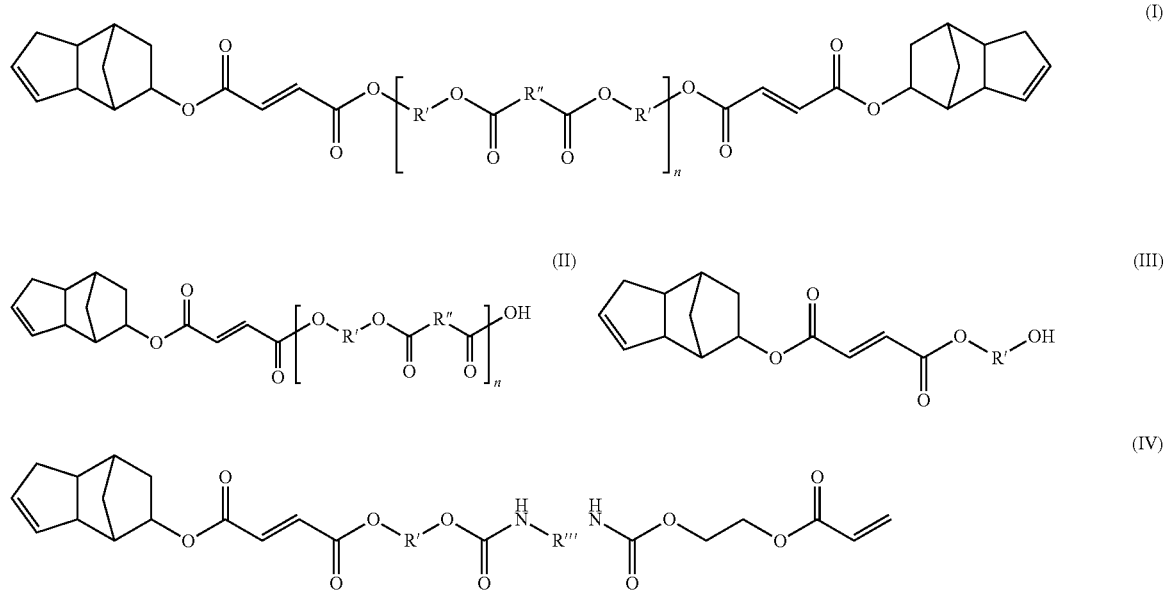

picrylhydrazyl, hydroquinone, 4-methoxyphenol, phenothiazine, or a combination thereof.

* * * * *